United States Patent Office 2,973,351
Patented Feb. 28, 1961

2,973,351

NEW MONOAZO-DYESTUFFS

Rene de Montmollin, Neuallschwil, and Henri Riat, Arlesheim, Switzerland, assignors to Ciba Limited, Basel, Switzerland No Drawing. Filed Mar. 3, 1958, Ser. No. 718,433

Claims priority, application Switzerland Mar. 8, 1957

6 Claims. (Cl. 260—199)

This invention provides valuable new monoazo-dyestuffs which correspond to the general formula (1)
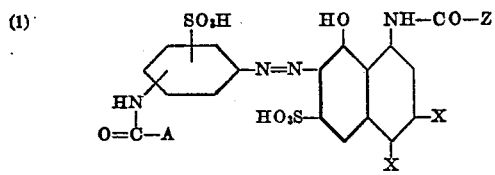

in which A represents a β-halogen-alkyl group, Z represents a benzene radical, a β-halogen-alkyl or a lower alkyl group, and one X represents a hydrogen atom and the other X a sulfonic acid group.

The invention also provides a process for the manufacture of the monoazo-dyestuffs of the above general formula, wherein a diazo-compound of an aromatic amine of the formula (2)
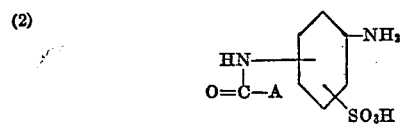

in which A has the meaning given above, is coupled with a coupling component of the formula (3)
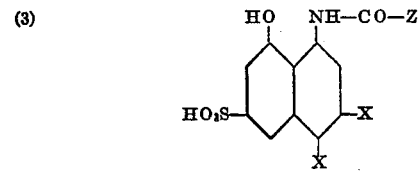

in which Z and X have the meanings given above. The aforesaid symbols also have those meanings in the formulae given below.

The coupling components of the Formula 3 used as starting materials in the process of this invention can be made by methods in themselves known, for example, by monoacylating 1-amino-8-hydroxynaphthalene-3:6- or -4:6-disulfonic acid with the anhydride or a halide of an acid of the formula

HOOC—Z

The monoacylation may be carried out, for example, in a weakly alkaline aqueous medium with benzoic acid chloride, nitro-, methyl-, methoxy- or chloro-benzoyl chloride or with β-bromo- or β-chloro-propionyl chloride.

As diazo-components there may be used, for example, 4- or 5-β-bromopropionylamino-2-aminobenzene-1-sulfonic acid or more especially 4- or 5-β-chloropropionyl-amino-2-aminobenzene-1-sulfonic acid.

These amines can be diazotized by the usual methods for example, with sodium nitrite and a mineral acid, and the diazo-compounds so obtained may be coupled with the coupling components of the Formula 3 in a neutral to alkaline aqueous medium, for example, an aqueous medium rendered alkaline with sodium carbonate.

The dyestuffs of the Formula 1, in which A and Z each represent a β-halogen-alkyl group, can be obtained by the diacylation of dyestuffs of the formula

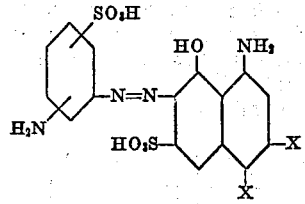

(obtainable by methods in themselves known) with the anhydride or halide of a β-halogen-alkyl-carboxylic acid, especially β-chloro-propionyl chloride, for example, in an aqueous medium in the presence of an acid binding agent.

The dyestuffs of the Formula 1 are new. They are useful for dyeing or printing a very wide variety of materials, for example, those of animal origin such as silk and especially wool, and also various artificial fibers, for example, those of animalized artificial silk, superpolyamide fibers or superpolyurethane fibers, and especially polyhydroxylated fibrous materials which may be synthetic as, for example, in the case of regenerated cellulose, or natural materials, for example, cellulose, linen and especially cotton. They are especially suitable for the production of aqueous dyestuff solutions to be used for dyeing, foularding or printing. After being applied to the fiber by foularding, printing or direct dyeing, the dyestuffs can be fixed by subjecting them to a heat treatment in the presence of an alkali, for example, sodium carbonate, sodium hydroxide, an alkaline earth metal hydroxide or trisodium phosphate. The dyeing may be carried out, for example, at a raised to moderately raised temperature, that is to say, within the range of 50° C. to 100° C. In order to exhaust the dyebath it is of advantage to add, if desired, in portions, when the dyebath is prepared or during the dyeing process a more or less neutral, preferably inorganic salt, such as an alkali metal chloride or sulfate. During the dyeing process the labile group present in the dyestuff reacts with the polyhydroxylated material to be dyed, whereby the dyestuff is probably fixed by chemical combination. The addition of an acid-binding agent to the dyebath may be made at the outset of the dyeing operation, but the alkaline agent is advantageously added in such manner that the pH value of the initially weakly acid to neutral or weakly alkaline dyebath gradually increases during the entire dyeing operation.

With the dyestuffs of the present invention there are produced on polyhydroxylated, especially cellulosic, materials very valuable strong and generally very full dyeings or prints having excellent properties of wet fastness and of good fastness to light.

In certain cases it may be of advantage to subject the dyeings produced by the process to an after-treatment. Thus, for example, the dyeings so produced are advantageously soaped, whereby any incompletely fixed dyestuff is removed.

The following examples illustrate the invention, the parts and percentages being by weight unless otherwise stated and the relationship of parts by weight to parts by volume being the same as that of the kilogram to the liter:

*Example 1*

27.8 parts of 4-β-chloropropionylamino-2-aminobenzene-1-sulfonic acid are diazotized in 30 parts of hydrochloric acid of 30% strength and 200 parts of water at 0° C. with a solution of 7 parts of sodium nitrite in 25 parts of water.

The diazo-solution so obtained is run in the form of a thin jet at 0–5° into a well stirred solution of 41 parts of 1-β-chloropropionylamino-8-hydroxynaphthalene-3:6-disulfonic acid in 100 parts by volume of a 2 N-solution of sodium carbonate and 400 parts of water. When the coupling is complete about 70 parts of sodium chloride are added, and the precipitated dyestuff is filtered off, washed with sodium chloride solution of 10% strength and dried. The dyestuff so obtained dyes cotton by the method described in Example 3 red tints that are fast to washing.

It also dyes wool fast red tints from an acetic acid to neutral bath.

Somewhat more yellowish tints are obtained by using the dyestuff obtained in an analogous manner from 1-β-chloropropionylamino-8-naphthol-4:6-disulfonic acid.

Similar dyestuffs are obtained by the method described above from the components given in columns I and II of the following table, in which the tints of the dyeings produced with these dyestuffs on cotton are given in column III.

|    | I | II | III |
|---|---|---|---|
| 1 | 4-(β-Chloropropionyl)-amino-2-aminobenzene-1-sulfonic acid. | 1-Benzoylamino-8-hydroxynaphthalene 4:6-disulfonic acid. | red. |
| 2 | ......do...... | 1-benzoylamino-8-hydroxynaphthalene-3:6-disulfonic acid. | Do. |
| 3 | 5-(β-Chloropropionyl)-amino-2-aminobenzene-1-sulfonic acid. | ......do...... | red violet. |
| 4 | ......do...... | 1-benzoylamino-8-hydroxynaphthalene-4:6-disulfonic acid. | Do. |
| 5 | ......do...... | 1-chloracetylamino-8-hydroxynaphthalene-3:6-disulfonic acid. | bluish red. |
| 6 | ......do...... | 1-(n-butyryl)-amino-8-hydroxynaphthalene-3:6-disulfonic acid. | Do. |
| 7 | ......do...... | 1-(β-chloropropionyl)-amino-8-hydroxynaphthalene-3:6-disulfonic acid. | Do. |
| 8 | ......do...... | 1-(4'-methylbenzoyl)-8-hydroxynaphthalene-3:6-disulfonic acid. | red violet. |
| 9 | ......do...... | 1-(4'-nitrobenzoyl)-8-hydroxynaphthalene-3:6-disulfonic acid. | Do. |
| 10 | 5-(β-bromopropionyl)-amino-2-aminobenzene-1-sulfonic acid. | 1-benzoylamino-8-hydroxynaphthalene-3:6-disulfonic acid. | Do. |
| 11 | 4-(β-chloropropionyl)-amino-2-aminobenzene-1-sulfonic acid. | 1-(2':4'-dichlorobenzoyl)-amino-8-hydroxynaphthalene-3:6-disulfonic acid. | red. |
| 12 | ......do...... | 1-(4'-chlorobenzoyl)-8-hydroxynaphthalene-3:6-disulfonic acid. | Do. |
| 13 | 4-(β-bromopropionyl)-amino-2-aminobenzene-1-sulfonic acid. | 1-(β-bromopropionyl)-amino-8-hydroxynaphthalene-3:6-disulfonic acid. | Do. |

*Example 2*

60.2 parts of the dyestuff of the formula

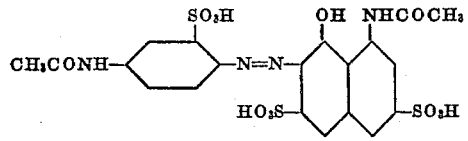

are heated in 1000 parts of sodium hydroxide solution of 4% strength for 2–3 hours at 90–95° C. in order to hydrolyze the acetylamino groups, and then the mixture is neutralized with hydrochloric acid at room temperature. At 0–5° C. there are slowly added dropwise, while stirring well, 30 parts of β-chloropropionyl chloride until free amino groups can no longer be detected, and the mixture is simultaneously neutralized with sodium carbonate so that the reaction medium is maintained at a pH value of 6.5 to 7.5. The dyestuff so formed, after being salted out in known manner is filtered off and dried. The dyestuff so obtained dyes cotton bluish red tints, which are fast to washing, by the method described in

*Example 3.* It also dyes wool from an acetic acid to neutral bath bluish red tints.

*Example 3*

1 part of the dyestuff obtained as described in the first paragraph of Example 1 is mixed with 9 parts of urea dissolved in 100 parts of water. A cotton fabric is impregnated with this solution of 80° C. on a foulard, and the excess liquor is removed by squeezing until the material retains 75% of its weight of dyestuff solution. The material so impregnated is dried, then impregnated at room temperature in a solution containing per liter, 10 grams of sodium hydroxide and 300 grams of sodium chloride, then squeezed to a weight increase of 75%, and steamed 60 seconds at 100–101° C. The material is then rinsed, treated in sodium bicarbonate solution of 0.5% strength, rinsed, soaped for ¼ hour in a solution of 0.3% strength of a non-ionic detergent at the boil, rinsed and dried. There is obtained a red dyeing which is fixed fast to boiling.

What is claimed is:

1. A monoazo dyestuff which in its free acid state corresponds to the formula

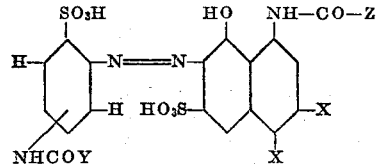

wherein Y represents an ethyl group bearing a member selected from the group consisting of a chlorine and a bromine atom in β-position and bound in a α-position to the —CO-group, one X represents a hydrogen atom, the other X a sulfonic acid group and Z a member selected from the class consisting of a benzene radical and a β-chloroethyl group bound to the —CO-group in α-position.

2. A monoazo dyestuff which in its free acid state corresponds to the formula

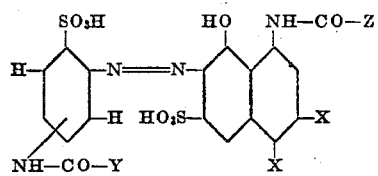

wherein Y represents the β-chloroethyl group, one X represents a hydrogen atom, the other X a sulfonic acid group, and Z the β-chloroethyl group.

3. A monoazo dyestuff which in its free acid state corresponds to the formula

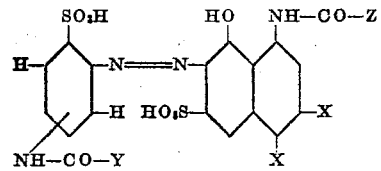

wherein Y represents the β-chloroethyl group, one X represents a hydrogen atom, the other X a sulfonic acid group, and Z a benzene radical.

4. The monoazo dyestuff which in its free acid state corresponds to the formula

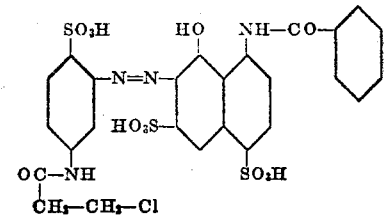

5. The monoazo dyestuff which in its free acid state corresponds to the formula

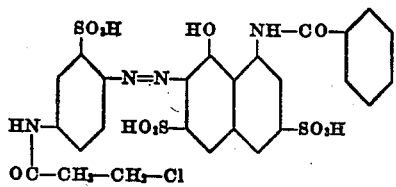

6. The monoazo dyestuff which in its free acid state corresponds to the formula

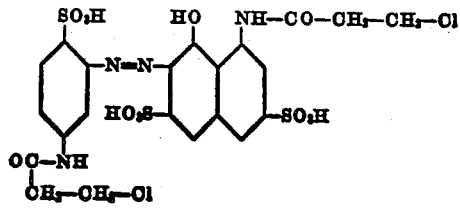

References Cited in the file of this patent

UNITED STATES PATENTS

| | | |
|---|---|---|
| 1,844,031 | Clingestein et al. | Feb. 9, 1932 |
| 2,102,115 | Fleischhauer et al. | Dec. 14, 1937 |
| 2,183,489 | Fleischhauer | Dec. 12, 1939 |
| 2,213,697 | Fleischhauer et al. | Sept. 3, 1940 |
| 2,384,754 | Knight et al | Sept. 11, 1945 |
| 2,384,755 | Knight | Sept. 11, 1945 |

OTHER REFERENCES

Guthrie, J. D.: American Dyestuff Reporter, vol. 41, No. 1, January 7, 1952, pages 13, 14, and 30.